June 16, 1964

D. NICOLL ETAL 3,137,397

NUCLEAR REACTOR FUEL HANDLING SYSTEM

Filed Aug. 2, 1961

Inventors
DAVID NICOLL
JACKSON L HEDGECOCK
BY Roland A. Anderson
Atty.

3,137,397
Patented June 16, 1964

3,137,397
NUCLEAR REACTOR FUEL HANDLING SYSTEM
David Nicoll, La Jolla, and Jackson L. Hedgecock, Encinitas, Calif., assignors, by mesne assignments, to the United States of America as represented by the United States Atomic Energy Commission
Filed Aug. 2, 1961, Ser. No. 128,903
4 Claims. (Cl. 214—18)

The invention relates generally to nuclear reactors and to equipment for handling fuel elements, or the like, which are associated with nuclear reactors. More particularly, the invention relates to apparatus for charging a nuclear reactor with fuel elements, or the like, and for removing and disposing of "spent" fuel elements.

In any nuclear reactor which is intended to operate over an extended period of time, such as for instance, a reactor which is to be utilized for the generation of electrical power, the reactor facility should be constructed to provide for removal and disposal of "spent" fuel elements and for recharging of the reactor with new or unused fuel elements. Such installations preferably include reactor vessels having one or more access ports enabling insertion and removal of fuel elements and other equipment. In addition, temporary storage facilities should also be provided for new fuel elements which are to be loaded into the reactor and for "spent" fuel elements which are removed from the reactor.

In general, some of the problems associated with charging of fuel elements into a reactor include preventing exposure of the surrounding environment to contaminated gases or particles incident to opening of the reactor, either to remove or replace a fuel element, and incident to loading or unloading of a fuel element at a storage area; shielding of either new or "spent" fuel elements during transportation between the reactor and associated storage areas so as to substantially prevent radiating the surrounding environment; and the "packaging" of "spent" fuel elements, as for instance, in a metal can or canister, to thereby permit removal from the site and eventual disposal.

The invention disclosed herein has for a general or principal object the provision of apparatus for loading and unloading a nuclear reactor with fuel elements and for "packaging" "spent" fuel elements so as to provide an effective solution to all of the above mentioned problems. Another principal object is the provision of cooperating appartus for handling fuel elements, or the like, so as to facilitate loading and unloading of such elements in and from a reactor, and for canning "spent" fuel elements while preventing escape into the surrounding environment of contaminated gases or particles from the reactor.

Other objects of the invention include the provision of apparatus for raising, lowering, and transporting fuel elements, or the like, and the provision of a grapple which is operable within an air tight enclosure and which is mechanically connected to said controlled by apparatus located exteriorly of the enclosure.

Another object of the invention is the provision of apparatus for canning "spent" fuel elements. Still other objects and advantages of the invention will become known by reference to the following description and the accompanying drawings of one embodiment of the invention.

Figure 1:
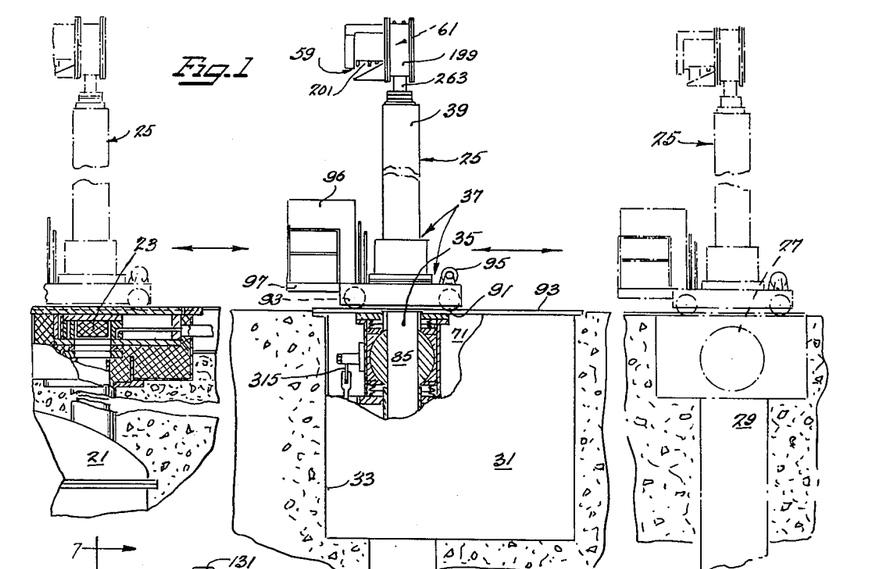
FIGURE 1 is a partially diagrammatic view of a reactor facility incorporating various of the feaures of the invention.

One arrangement incorporating various of the features of the invention is shown in FIGURE 1, wherein there is illustrated the upper portion of a vertically disposed reactor vessel 21 having an access or charge port 23, a charge machine or apparatus 25 which is movable along a track relative to the reactor access port 23, an access port 27 incorporated in a pick-up cell 29 located at one side of the reactor vessel and adapted for storing unused fuel elements, and a "canning" apparatus or machine 31 which is located in a pit 33 or the like, in the path of the charge machine track and intermediate the pressure vessel and the pick-up cell, and which also incorporates an access port 35. Although certain features of the invention are usable with other types of reactors, the disclosed arrangement has been particularly designed for use in connection with a high temperature, gas-cooled reactor and will be described with respect thereto.

Figure 2:
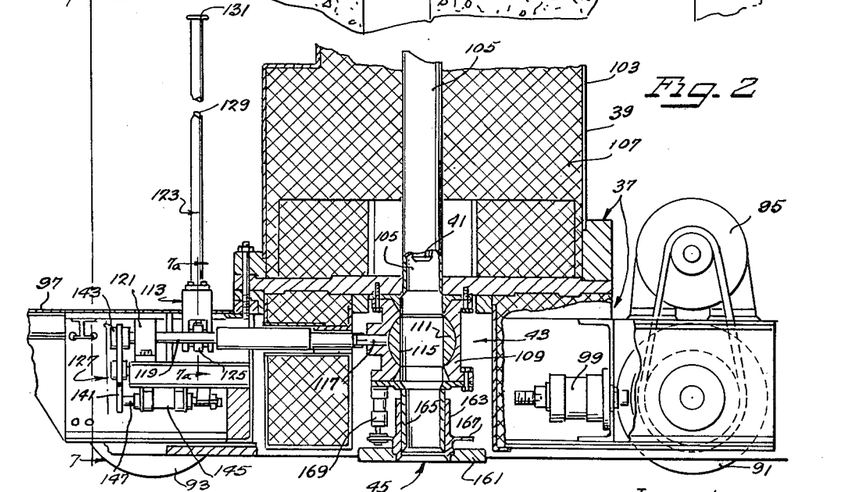
FIGURE 2 is an enlarged and partially sectioned, fragmentary view of the lower part of the charge machine shown in FIGURE 1.

The charge machine, as shown in FIGURES 1 and 2 includes, basically, a movable frame or support means 37 carrying a tubular housing or coffin 39 which is adapted to receive a fuel element 41. At its bottom, the housing is closed by an isolation valve 43 (see FIGURE 2) which is selectively adapted to provide access to the housing 39 from the bottom, thereby enabling insertion therein of a fuel element, and to seal the housing 39 so as to prevent the escape of any contaminated gas. Also located at the bottom of the housing is a coupling means 45 adapted for selective connection in fluid-tight engagement, with the access ports 23, 27 and 35 of the reactor, pick-up cell, and canning machine, respectively. Sealing engagement of the charge machine 25 to the access ports 23, 27 and 35 permits transfer to and from the charge machine of a fuel element without the escape of any contaminated gas into the surrounding environment or atmosphere through the joint or connection between the charge machine and any particular one of the access ports.

Carried within the housing (see FIGURES 4 and 8) is a grapple 47, which is movable through the isolation valve 43 to a position within the reactor, pick-up cell, or canning machine for depositing, or withdrawing, a fuel element. The grapple 47 includes a grappling means 49 at its lower end (see FIGURE 8) for gripping the upper end of the fuel element 41 and is supported by a series of flexible members 51, 53 and 55 (see FIGURES 3 and 8) which are operable to move the grapple, together with any load engaged thereby, and to afford opening and closing of the grappling means 49. In this regard, the supporting flexible members 51, 53 and 55 pass out of the grapple housing through a sealing means 57 (see FIGURES 3 and 4) at the top of the housing and are connected to a hoist mechanism 59 (see FIGURES 1, 3 and 4). Associated with the hoist 59 is a control and drive means 61 (see FIGURES 1, 4 and 5) for opening and closing the grapple.

Referring to the "canning" machine 31, this apparatus comprises (FIG. 13) a fluid tight chamber 71 located in the pit 33 below the path of travel of the charge machine 25. Extending from, and forming a part of, the chamber 71 is a receptacle 73 for receiving an elongated tubular container or canister 75 adapted for receiving a "spent" fuel element 41 having one closed end and one open end. When the container is received in the receptacle 73, the open end is upwardly exposed within the chamber 71. Also incorporated in the chamber 71 is mechanism 77 for receiving a cap or cover 79 adapted to close the container 75 and for placing the cap 79 on the open end of the container. A sealing means 81 is also provided in the chamber for uniting the cap 79 to the container 75 so as to provide a mechanical connection as well as a hermetic seal.

Figures 13, 14:
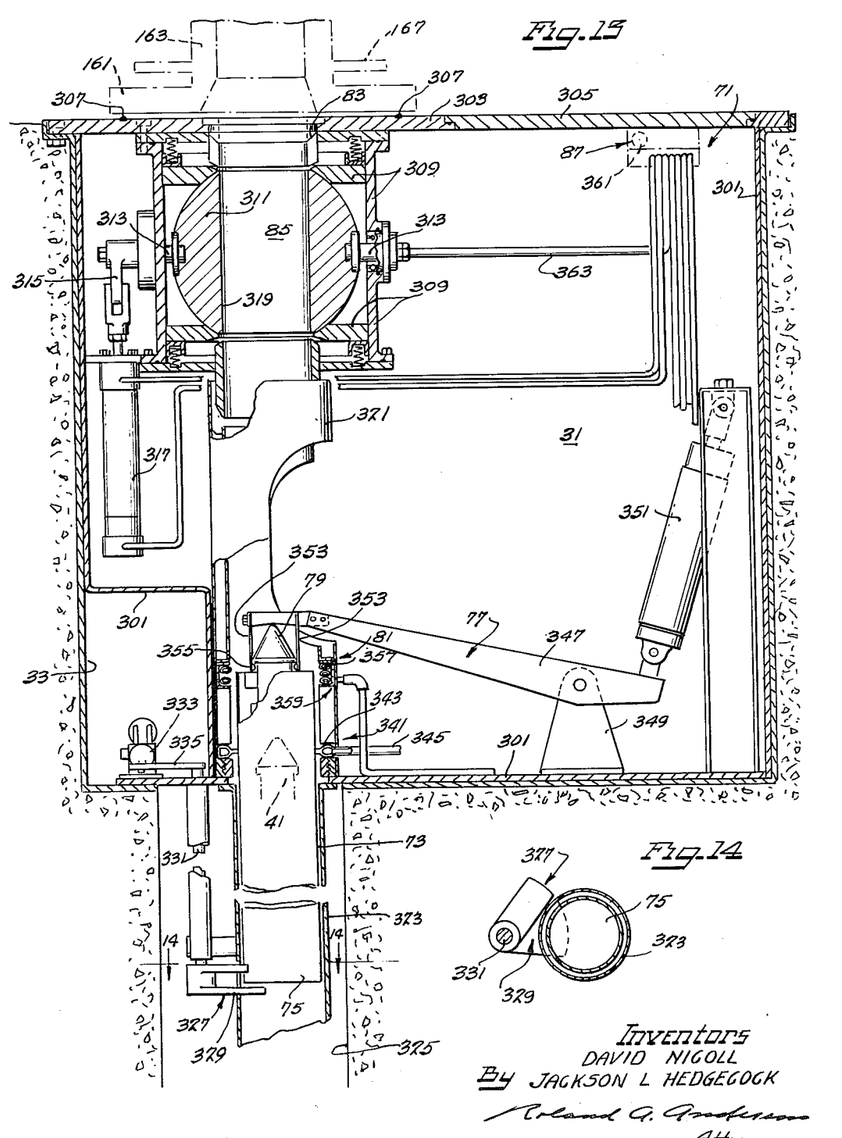
FIGURE 13 is an enlarged view, partially broken away and in section, illustrating the "canning" machine shown in FIGURE 1.
FIGURE 14 is a sectional view taken generally along line 14—14 of FIGURE 13.

As in the access ports associated with the reactor 21 and pick-up cell 29, the chamber 71 includes a mouth 83 having associated therewith an isolation valve 85 which is selectively operable to prevent the escape of gas from the canning machine 31, and to provide access to the receptacle 73 so as to permit placement therein of one of the containers 75 or of a "spent" fuel element 41 which is placed in the container. The chamber also incorporates purging means 87 for removing a contaminated or undesired atmosphere and for selectively replacing such atmosphere with a new atmosphere.

As already pointed out, with respect to FIGURES 1 and 2, the charge machine 25 includes the frame 37 which supports the various components of the apparatus. In this regard, there are mounted at each end of the lower portion of the frame, pairs of wheels 91 for supporting and facilitating travel of the charge machine on a track 93 between the reactor 21, the canning machine 31, and the pick-up cell 29. The wheels 91 at one end of the frame are driven by a reversible electric motor 95, which is controllable from a console 96 (see FIGURE 1) mounted on an operating platform 97 on the frame. Movement of the frame can be braked and the charge machine held in any selected position by suitable brake means which, in the disclosed construction, comprises a pair of pneumatic brake cylinders 99 located in position for engagement with the drive wheels 91.

The housing 39 in the disclosed apparatus includes an elongated tubular structure 103 which is mounted on the lower part of the frame and which incorporates a central cavity 105 (see FIGURES 2 and 4) adapted for receiving a fuel element and for permitting travel therein of the grapple 47. The lower portion of the cavity in which the fuel element is carried is surrounded by a suitable shielding 107 which can be of lead blocks or of lead shot. If desired, cooling means can be located in surrounding relation to the cavity to provide for dissipation of heat from a "spent" fuel element received from the reactor.

As shown in FIGURE 2, the lower end of the cavity 105 communicates with the isolation valve 43. Although various forms of isolation valves can be employed, the disclosed valve includes a socket 109 mounted on the lower portion of the frame, a valve element 111 in the form of a ball rotatably received in the socket, and means 113 for positioning the valve element so as to either provide a fluid-tight seal at the lower end of the cavity or to permit free access thereto for the loading and unloading of a fuel element.

The ball shaped valve element 111 includes a diametrical bore 115, which permits free access to the cavity 105 when the bore is positioned in axial alignment with the cavity. Rotation of the valve element 111 about a horizontal axis to selectively open and close the lower end of the cavity is facilitated by a stud shaft 117 which extends through a mating aperture in the socket 109 and which includes a noncircular terminal portion adapted to be engaged by the valve element positioning means 113.

The valve element positioning means 113 (see also FIGURES 7 and 7a) includes a longitudinally extending shaft 119, which is journalled adjacent one end in a bearing 121 and which has a socket at its other end for non-rotatively receiving the terminal portion of the stud shaft 117 on the valve element. The valve element positioning means also includes a lever 123 for rocking the shaft 119 so as to cause related movement of the valve element.

Figures 5, 7:
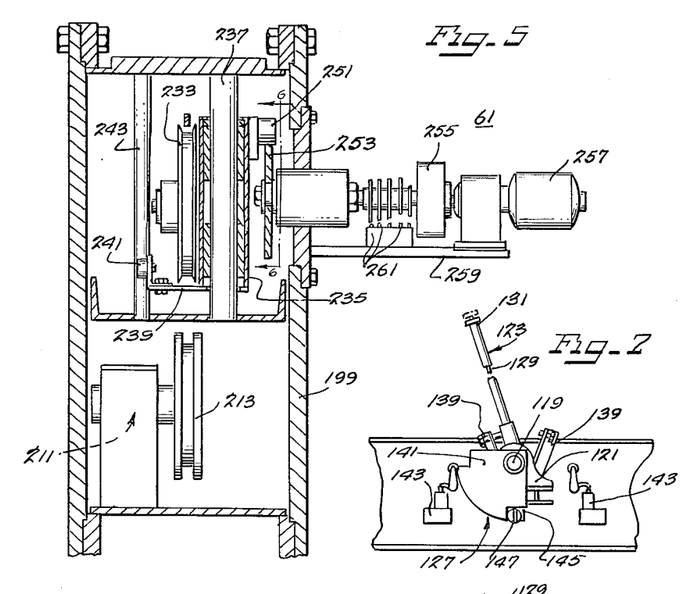
FIGURE 5 is a rear elevational view of a portion of the structure in FIGURE 3, with parts broken away and in section.
FIGURE 7 is a view taken generally along line 7—7 of FIGURE 2.
Figure 7A:
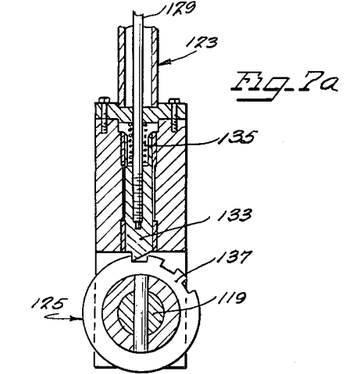
FIGURE 7a is an enlarged sectional view taken generally along line 7a—7a in FIGURE 2.

The lever 123 is connected at its lower end with a ratchet device 125 so as to afford incremental rocking of the shaft 119. This latter device is seen best in FIGURE 7a and comprises, in part, a stem 129 which is carried axially within the lever 123 for linear axial movement and for rotative movement relative to the lever. The stem 129 is provided with a handle 131 at its outer end and a pawl or dog 133 at its inner end. The stem 129 is biased toward the shaft 119 by suitable means, such as a spring 135, so as to normally effect engagement of the dog 133 with a sprocket 137 fixed to the shaft 119. As a result, when the components are disposed as shown in FIGURE 7a, the lever can be incrementally rocked in the counterclockwise direction to cause corresponding angular movement of the shaft 119. However, when desired, the stem 129 can be radially withdrawn to disengage the dog 133 from the sprocket 137, and lever 123 can then be rotated about 180 degrees and the stem then released to re-engage the dog with the sprocket, so as to facilitate rocking of the shaft 119 and valve element 111 in the clockwise direction. In order to limit rocking of the lever 123 through an angle to either side of the vertical which is approximately equal to the angle between adjacent teeth on the sprocket 137, a stop 139 seen best in FIGURE 7 is located at each side of the lever.

Movement of the shaft 119 from either of its open-valve or closed-valve positions is controlled by a cam 141 (FIGURE 7) which is located at the outer end of the shaft 119 and includes a quarter-round arcuate section. The cam 141 is engageable with a pair of switches 143, which are spaced apart so as to detect approach of the shaft 119 toward either of its open-valve or closed-valve positions. The switches 143 are connected to a cylinder 145 (see FIGURE 2), which is operable to extend a plunger 147 into the path of the quarter round cam section whenever the valve element 111 is in either its open or its closed position so as to prevent unintentional displacement of the valve element from the selected position.

The coupling means 45, by which the housing 39 can be connected in fluid-tight relation to the access ports of the reactor 21, canning machine 31, or the pick-up cell 29, comprises a pressure plate 161 which is fixed to the outer one of a pair of fluid-tight, telescopically joined tube sections 163 and 165. The inner section 165 is fixed to the bottom of the socket 109 in axial alignment with the cavity 105 in the housing 39. In order to effect movement of the outer telescopic tube section 163 relative to the inner telescopic tube section 165, so as to position the pressure plate 161 in sealing engagement with the gasket associated with the selected access ports, the outer telescopic tube section 163 is provided with a fixedly extending collar 167 which is connected to the ends of the plunger portions of a plurality of pneumatic rams 169, which rams have their cylinders fixed to a flange welded to the cylindrical tube section 165 which is attached to the under surface of the socket 109. Thus, when the pressure air is supplied to the rams 169, the pressure plate 161 is moved downwardly from the isolation valve 43 in order to provide a fluid-tight seal with the adjacent access port.

The grapple 47 which is carried within the cavity 105 for vertical movement relative thereto comprises, as seen best in FIGURES 8 through 12, a generally hollow, cylindrical main body 175 having, at the lower end thereof, a socket 177 adapted to receive the upper end of a fuel element or other object which is to be transferred. The grapple 47 includes the gripping members 49 which, in the disclosed construction, are three in number and are equiangularly located about the axis of the body 75. These members are pivotally carried by the body at their upper ends for movement of the jaw sections 179 at their lower ends relative to their gripping positions. The movement of the jaw sections 179 relative to the body 175 is controlled by a plunger 184 which is disposed axially in the body 175 and which is connected with the individual jaw sections. More particularly, the plunger 184 has a plurality of pins 181 thereon, each of which is movable in a camming slot 185 formed in each gripping member 49. The slots 185 are formed so that the desired lateral movement of the gripping members 49 is achieved through axial movement of the plunger 184. In this regard, when the pins 181 are located at the lower ends of the slots 185, the gripping members are disposed inwardly toward each other in their fuel element gripping positions. When the pins 181 are disposed at the upper ends of the slots 185, the gripping members are spaced apart their maximum amount to gripping positions for engaging the inner surface of a hollow cylindrical object. The gripping members 49 are biased toward their innermost, fuel element-gripping positions, as by providing the plunger 184 with a counterweight.

Figures 8, 9, 10, 11, 12:
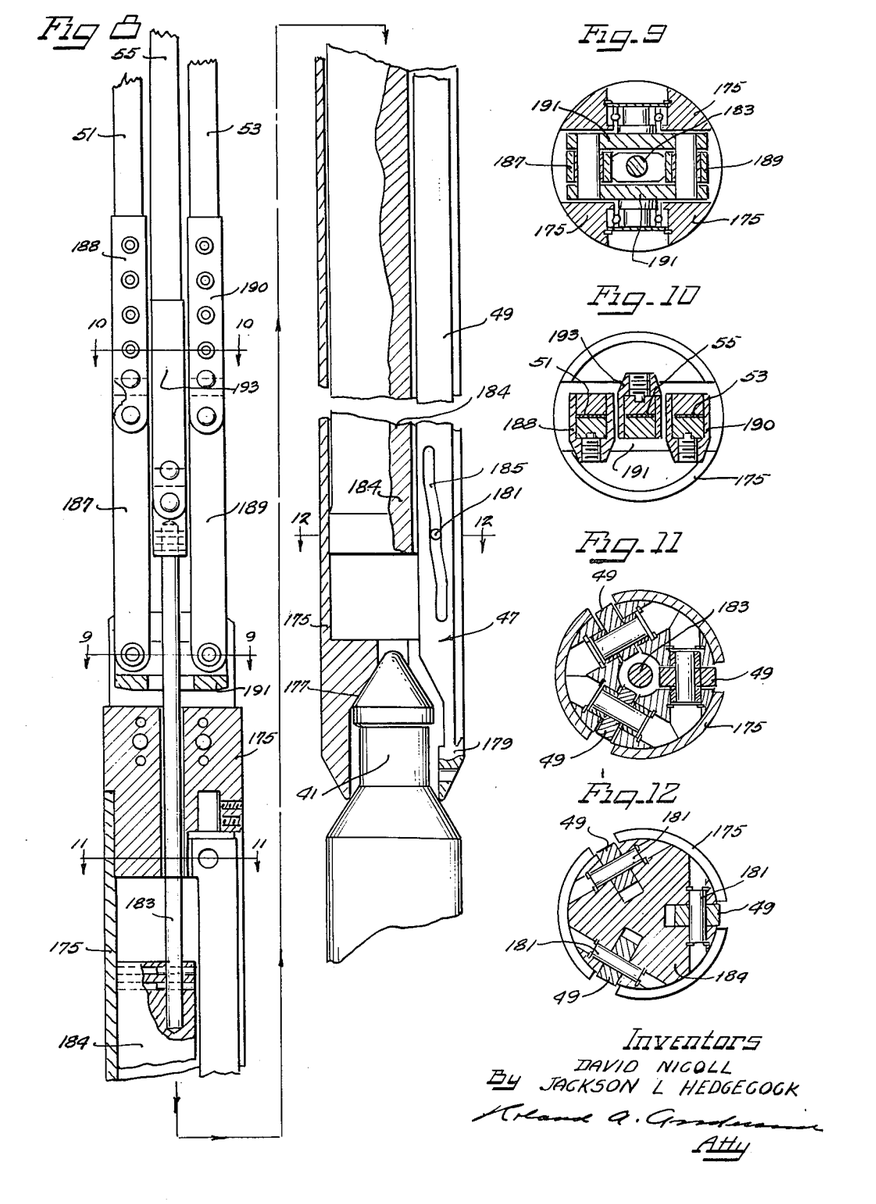
FIGURE 8 is an enlarged view, partially broken away and in section, showing the grapple incorporated in the charge machine shown in FIGURE 1.
FIGURES 9, 10, 11 and 12 are sectional views taken respectively along lines 9—9, 10—10, 11—11, and 12—12 of FIGURE 8.

As already indicated, the grapple 47 is supported, and the gripping members 49 are operated, by a series of flexible members 51, 53 and 55 (see FIGURE 8) which pass through the sealing means 57 (see FIGURES 3 and 4) at the top of the housing 39 and which are connected to the hoist 59. More particularly, as seen in FIGURE 8, the flexible members 51 and 53 provide a support for the grapple and comprise a pair of thin steel tapes which are pivotally connected at their lower ends, through clamps 188 and 190, to a pair of bar elements 187 and 189 which, in turn, are pivotally connected to an equalizer bar 191 which is pivotally connected to the top of the grapple body 175. As a result, the load is always equally carried by the tapes 51 and 53. However, should one tape break, the mounting of the equalizer bar 191 at the top of the grapple body 175 serves to limit pivoting of the equalizer bar, thereby preventing fouling of the tapes.

Figure 4:
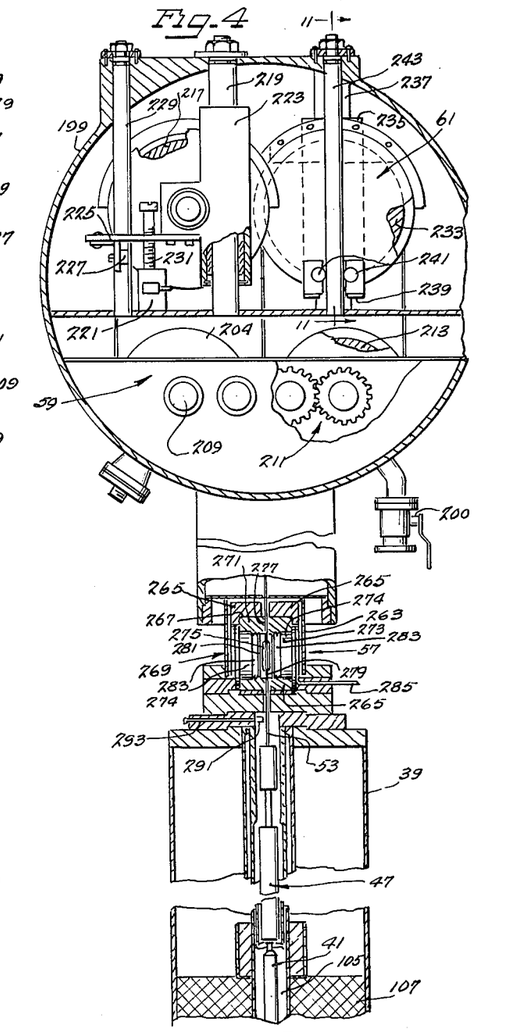
FIGURE 4 is a partially sectioned, side elevational view of the structure shown in FIGURE 3, as seen from the right side.

The third tape 55 is located between the two supporting tapes 51 and 53 and is connected with the plunger 184 through a clamp 193 and a rod 183 which extends upwardly from the plunger. All of the tapes are wound and unwound in unison by the hoist means 59 which is carried by an upper portion 199 of the frame. As seen in FIGURE 4, the upper portion 199 of the frame is constructed to be generally fluid-tight and includes a valve 200 (FIGURE 4) affording communication with a purge system, to provide for purging of housing 199.

The hoist 59 includes a reversible electric motor 201 (see FIGURE 1) which is suitably connected by means including a coupling 203 (see FIGURE 3) to a double pulley having spaced apart grooves 205 and 207 which accommodate the supporting tapes 51 and 53. The drive pulley 204 is supported on a shaft 209, which is drivingly connected with a gear train 211 which serves to drive a second pulley or drum 213 (see FIGURE 4) that is connected to and carries the third tape 55 attached to the plunger 184. The overall configuration of the drums 204 and 213, the arrangement of the attachment of the tapes to the drums, and the arrangement of the gear train 211 by which the drums are driven in unison is such that, at any particular time, the tapes 51, 53 and 55 are all wound and unwound at substantially the same speed.

In order to permit measuring of the load on the support tapes 51 and 53 and to thereby enable determination if one of the support tapes is broken, the tapes 51 and 53 are respectively trained around a pair of idler pulleys 215 and 217 (see FIGURE 3) which are respectively carried on separate upright posts 219 for relative movement therealong and have associated therewith strain gauge load cells 221. More particularly, each of the idler pulleys 215 and 217 is respectively mounted on a bracket 223 (see FIGURE 4) supported for vertical movement on one of the upright posts 219. Extending from each bracket is an arm 225 which, at its outer end, carries a pair of followers 227 in straddling engagement with an upright standard 229 to prevent horizontal pivoting of the bracket 223 relative to the upright post 219. Extending from the arm is a screw actuator 231 which engages one of the strain gauge or other type load cells 221 in such manner as to reflect the load which is transmitted from the support tape to the idler pulley.

The tape 55, which is connected to the plunger 184 and which serves to operate the gripping members 49, is disposed around the drum 213 and an idler pulley 233 (see FIGURES 4 and 5). The idler pulley 233 is mounted on a bracket 235 which is supported on an upright post 237 for movement axially therealong. In order to prevent horizontal swinging of the bracket 235 about the post 237, an arm 239 extends from the bracket 235 and has, at its outer end, a pair of followers 241 in straddling engagement with an upright standard 243.

Vertical movement of the idler pulley 233 along on the upright post 237 relative to the other idler pulleys 205 and 207, results in variation in the effective distance from the plunger-tape drum 213 to the grapple 47, as compared to the effective distance from the support-tape drum 204 to the grapple 47. Such movement therefore results in related movement of the plunger 183 in the grapple body, with accompanying movement of the gripping members 49 relative to their gripping positions. In this last regard, the idler pulley 233 is so engaged that when it is in its lowermost or uppermost positions, the gripping members 49 are in their gripping positions.

Figure 6:
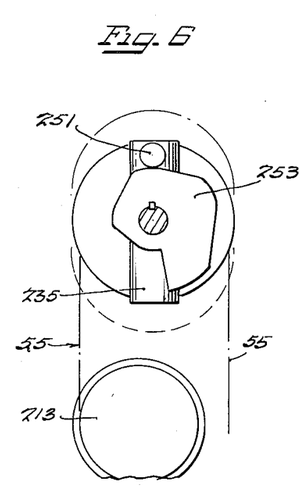
FIGURE 6 is a diagrammatic view of the means for raising and lowering the idler pulley which controls the opening and closing of the grapple incorporated in the charge machine shown in FIGURE 1.

The plunger-tape idler pulley 233 is movable axially along the upright post 237 by a grapple actuating drive including, as shown in FIGURES 5 and 6, a cam follower 251 which is mounted on the bracket 235 and a cam 253 which engages the follower 251 and is driven trough a gear box 255 by an electric motor 257. The motor 257 and gear box 235 are mounted on a sub-frame 259 extending from the upper frame portion. Limit switches 261 can be provided to permit control of the drive motor 257 as desired. The plunger-tape idler pulley 233 is biased toward its lowermost position and is retained in engagement with the cam by the counter weight in the plunger 184.

Figure 3:
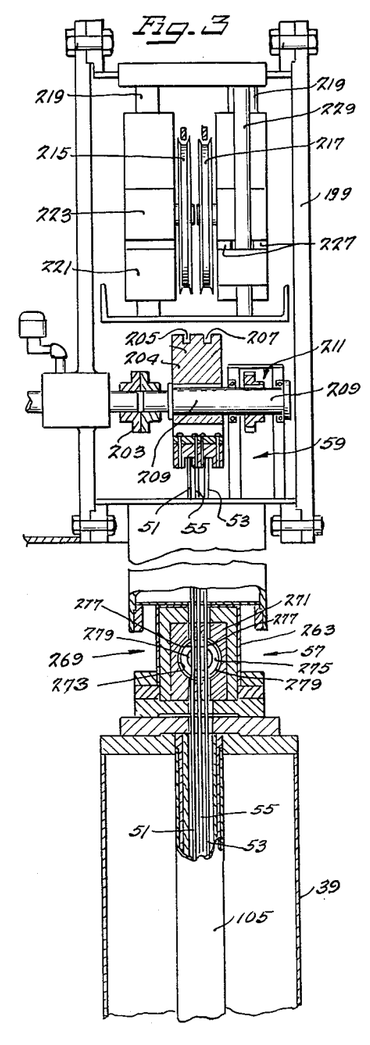
FIGURE 3 is an enlarged front elevational view, partially in section, of the upper part of the charge machine shown in FIGURE 1.

Passage of the tapes 51, 53 and 55 out of the upper end of the cavity 105 in the main housing 39 is permitted, while escape of contaminated gas from the housing 39 is prevented by the sealing means 57 which is shown in FIGURES 3 and 4 and is located in an intermediate part 263 of the frame between the housing 39 and the upper frame portion 199.

More particularly, the disclosed sealing means 57 includes a pair of blocks 265 which are supported by the intermediate frame portion 263 and provide an axial upright, cylindrical seat 267 for a generally cylindrical sealing unit 269. The sealing unit 269 includes a sleeve 271 having a transverse bore 273 and arcuate outer surfaces adapted for engagement with the cylindrical seat 267 to provide a fluid-tight sub-chamber 274. Positioned in a central plane within the bore is a thin ring 275 which, in the disclosed construction, is fabricated of brass and has inner and outer peripheries which are tapered to a thin edge. In addition, the upper and lower arcuate portions of the ring 275 are each provided with three slots 277 through which the respective support and plunger tapes are threaded.

Located on each side of the ring 275 is a cylindrical pad 279 of resilient, fluid impervious material, such a gum rubber. The pads 279 are each held in intimate engagement with the ring 275 by a washer 281, each of which, in turn, is held by an insert 283 which is threaded into the bore of the sleeve.

The resilient pads 279 are urged into intimate contact with the tapes 51, 53 and 55 passing through the ring 275 so as to prevent the escape of contaminated gas from the housing by pneumatic pressure. Specifically, the fluid-tight sub-chamber 274 is connected to a source of pressure gas by suitable piping 285. The pressure gas acts on the outer surfaces of the resilient pads 279 to urge them toward each other and into intimate engagement with the tapes and with the ring 275.

If desired, provision can also be included for washing the tapes to remove any adhering contaminated particles in order to permit maintenance of the grapple, replacement of the tapes, or other servicing. In the disclosed construction, the washing means comprises a shower head 291 (see FIGURE 4) which is supported by the frame at the top of the housing 39 and just prior to the point where the tapes pass into the sealing arrangement. The shower head 291 is connected by suitable piping 293 to a source of cleaning fluid.

A Operation of the Charge Machine

In the loading of a "spent" fuel element into the charge machine 25 from the access port 23 of the reactor 21, the charge machine is first located over the access port and the pressure plate 161 is lowered to sealingly engage the port gasket to provide a fluid-tight seal between the charge machine 25 and the reactor access port 23. The respective isolation valves of the charge machine 25 and of the access port 23 are then opened to permit lowering of the grapple 47 into the reactor for engagement with a "spent" fuel element previously located under the access port. The fluid-tight seal between the charge machine 25 and the access port 23 prevents escape of the contaminated coolant gas to the surrounding environment. Further, there is preferably provided means (not shown) for purging the space between the valves at the bottom of the charge machine and the access port.

Lowering of the grapple 47 into the reactor is controlled by the hoist motor 201 which is provided with a suitable system for indicating and controlling the position of the grapple within the charge machine 25 and within either the reactor 21 or the pick-up cell 29. The grapple actuating motor 257 serves to provide that the gripping members are open when the grapple engages the fuel element 41 and to provide for subsequent movement of the gripping members to their gripping positions. As previously mentioned, movement of the gripping members 49 relative to their "gripping" positions results from vertical movement of the idler pulley 233 along the upright post 237. When the "spent" fuel element is secured by the gripping members 49, the hoist motor 201 then operates to raise the fuel element into the shielded housing 39.

When the "spent" fuel element is fully positioned in the housing 39, the isolation valves in the charge machine 25 and in the access port 23 are then closed. The space between the isolation valves is then purged of contaminated coolant gas and refilled with air by means of the purging equipment associated with the access port. The pressure plate 161 is then lifted, breaking the seal between the access port 23 and the charging machine 25.

The loading operation of an unused fuel element from the pick-up cell 29 is substantially the same as the loading of a "spent" fuel element from the reactor 21. The charge machine is first sealed to the access port 27 of the pick-up cell, the space between the isolation valves is purged and then filled with helium, and then the isolation valves of the charge machine 25 and access port 27 are opened to permit lowering of the grapple 47 and subsequent hoisting of the grapple and connected fuel element into the housing 39. The isolation valves are then closed, and the atmosphere in the spaces between the valves is purged. The seal between the charge machine 25 and the pick-up cell 29 is then broken by raising the pressure plate 161, and the charge machine 25 is then moved to the reactor 21 for unloading of the new fuel element.

Unloading of a "spent" fuel element from the charge machine 25 to the canning machine 31 takes place after the charge machine is located over the canning machine access port 35 and the pressure plate 161 is lowered to sealingly connect the charge machine to the canning machine. After purging both isolation valves 43 and 85 are opened and the hoist motor 201 is operated to lower the "spent" fuel element into the container 75 in the chamber 71. When the fuel element 41 is fully disposed in the container, the grapple-actuating motor 257 raises the idler pulley 233 to open the gripping members 49. When the fuel element 41 is disengaged, the grapple 47 is again hoisted into the housing 39. At this point, the isolation valve 43 in the charge machine is closed and any contaminated coolant gas which escaped from the housing 39 into the chamber 71 is purged and replaced with air. At the same time, the contaminated coolant gas in the space between the isolation valves 43 and 85 is also replaced with air.

The isolation valve 85 in the canning machine 31 is then closed, and the pressure plate 161 is then raised, thereby breaking the seal between the charge machine and the canning machine. Escape of contaminated coolant gas to the surrounding environment is prevented by the previous expulsion of contaminated gas and subsequent replacement of "clean" air in the space between the isolation valves.

The charge machine can then be moved either to the access port 23 of the reactor 21 to remove another "spent" fuel element or to the access port of the pick-up cell to deliver an un-used fuel element to the reactor.

In the unloading of an unused fuel element into the reactor 21 a seal is first established between the pressure plate 161 of the charge machine 25 and the access port 23 of the reactor 21 and the space between the isolation valves is purged and filled with helium. Next, the isolation valves are opened and the fuel element is lowered into the reactor by the hoist means 59. When the fuel element is properly located in the reactor, the grapple 47 is detached from the fuel element and then raised into the housing. Both the isolation valves are then closed and the contaminated coolant gas in the space between the isolation valves is expelled, the space being refilled with "clean" air. The seal between the charge machine and the access port can then be broken without danger of the escape of contaminated coolant gas.

The Canning Machine

As shown in FIGURES 1 and 13, the canning machine is located in the pit 33, which is formed in concrete and located below the path of travel of the charge machine 25. The air tight chamber 71 in the pit is generally formed by a metal lining 301 and a cover 303 including a loading port or manhole 305 which facilitates loading of caps 79 into the cap receiving and placing means 77. The cover 303 also includes the mouth or opening 83 which forms a part of the access port 35 and which leads to the isolation valve 85. Surrounding the mouth 83 is circular gasket 307 adapted for sealing engagement by the pressure plate 161 of the charge machine 25. A plug or manhole (not shown) is also provided for removable seating in the mouth of the access port.

The isolation valve 85 functions, when closed, to seal the chamber 71 against the escape of fluid, and, when opened, to permit entry therein of the container 75, and of a fuel element from the charge machine 25. When the charge machine 25 is sealingly engaged with the cover 303, and the isolation valve 85 is open, the atmosphere in the charge machine cavity 105 can be purged by the purging means 87 associated with the canning machine 31.

Although isolation valves of various construction can be used, the disclosed valve 85 is of the socket and ball type, including a socket 309 adapted for receiving a valve element 311 of spherical or ball formation. The spherical valve element includes a pair of opposed trunnions 313 which are mounted in the socket 309 to facilitate rocking of the valve element about a horizontal axis. One of the trunnions is connected by a crank arm 315 to a ram 317 which is operable to rock the valve element between an open position and a closed position. In this last regard, the valve element 311 includes a bore 319 extending perpendicularly to the horizontal axis, which bore is vertically positionable to open the valve so as to permit entry into the chamber of the containers 75 and "spent" fuel elements. When the bore is disposed horizontally, the isolation valve is sealingly closed.

Extending downwardly from a position below the isolation valve 85 is a vertical sleeve 321 which extends to a position adjacent the receptacle 73 and is adapted for guiding the containers 75 and the "spent" fuel elements into the receptacle. The receptacle 73 constitutes a guide tube 323 located in an enlarged conduit 325 leading from the bottom of the pit 33 to a storage area (not shown) in which the "canned" fuel elements are retained until such time as their radiation level will permit safe disposal.

Extending within the conduit and positionable into the guide tube is a support means 327 for holding the container at a proper position within the guide tube 323 so that the open, upper end of the container is in position for receiving a cap 79 from the cap receiving and placing means 77 and in position for operation thereon by the means 81 which effects union of the cap 79 with the container 75.

While the various arrangements can be used for supporting the container 75 in proper position within the receptacle 73, the disclosed construction utilizes a pawl or cam 329 which is mounted on a vertical rock shaft 331 extending in parallel relation to the guide tube 323. The shaft 331 is carried by suitable bushings and bearings and is rotatable to provide movement of the container-supporting cam 329 relative to a position for supporting the container, by means of a ram 333 and a crank arm 335 located in the pit 33 exteriorly of the air tight chamber 71.

Escape of gas from the chamber 71 in the annular area between the container 75 and the guide tube 323 is prevented by a sealing means 341 which connects the outer surface of the container with the guide tube. The disclosed construction utilizes a pneumatic expansion seal in the form of a resiliently expandable toroidal member 343 which is inflatable to effect a fluid-tight seal between the container and the guide tube. Suitable piping 345 leads from the inflatable member 343 to the exterior of the chamber 71 to provide for inflation and deflation.

As already mentioned, after a "spent" fuel element has been deposited in a container 75 which is received and supported in the guide tube 323, a cap 79 is placed in the upper, open end of the container and united to the container to provide a mechanical connection and a hermetic seal. The means 77 for placing a cap in the open end of the container includes a capping arm 347 which is mounted intermediate its ends on a pair of spaced brackets 349 for pivotal movement about a horizontal axis. Movement of the capping arm 347 about its horizontal axis is provided by an actuating ram or cylinder 351 which is pivotally connected to one end of the capping arm. At its other end, the capping arm 347 includes means for releasably gripping the cap. In the disclosed construction, this means includes a series of resilient blades or fingers 353, each of which includes, at its lower end, a rounded detent 355 which is adapted to be received in an annular groove in the cap 79.

In the disclosed construction, the cap 79 is united, by brazing, to the top of the container 75 by an electrical induction coil 357 positioned adjacent the top of the guide tube, which coil, when energized, provides sufficient heat to fuse an alloy between cap and container. The fusable alloy can be carried by either the cap or the container. As will be noted hereafter, brazing of the cap to the container takes place in an inert atmosphere, as the chamber 71 is filled with helium during the brazing operation. Suitable coolant means 359 surrounding the induction coil are also provided in the usual fashion.

After the charge machine 25 pressure plate is sealingly engaged with the gasket 307 and when both isolation valves 43 and 85 are open, the atmosphere in the chamber 71, as well as the atmosphere in the charge machine 25 can be removed by the purging means 87.

The purging means 87 includes a purge line 361, together with associated valves (not shown), and suitable gas sources (not shown) for replacing expelled atmosphere. Also included in the disclosed construction, is a valve purge line 363 by which means any atmosphere in the socket 309 and valve elements 311 can be replaced as desired.

*Operation of the Canning Machine*

The canning machine 31 is prepared for the canning of a "spent" fuel element by initially filling the chamber 71 with non-contaminated air. The cap-loading port 305 is then temporarily opened and the cap 79 is placed in the resilient gripping means at the outer end of the capping arm 347. Either previously or thereafter, the plug (not shown) is removed from the mouth 83 of the access port and the isolation valve 85 is opened to permit passing a container 75 through the chamber 71 into the guide tube 323. At this time, of course, the supporting cam 329 is positioned so as to supportingly engage the lower end of the container 75, thereby properly locating the container in the guide tube 323.

After the container 75 is lowered into the guide tube by suitable means, the pneumatic expansion seal 341 is filled with air to seal the container to the guide tube so as to prevent the escape of gas out of the lower end of the guide tube. At this time, if the cap loading port 305 has not already been closed and sealed, this is now accomplished. The chamber 71 and the container 75 are then purged of air and filled with helium. The charge machine 25 is then located above the access port and the pressure plate 161 is actuated so as to establish a fluid-tight seal between the charge machine 25 and the canning machine 31. After the charge machine 25 is sealed to the canning machine, the space between the isolation valves 43 and 85 is purged and then filled with helium.

The isolation valve 43 in the charge machine and isolation valve 85 in the canning machine are now opened for lowering of the "spent" fuel element into the canning machine. Opening of the isolation valves results in exposure of the chamber 71 to the contaminated coolant gas which occupied the housing in the charge machine when the charge machine was loaded with a "spent" fuel element at the reactor access port 23.

The helium previously supplied within the chamber 71 and within the space between the isolation valves 43 and 85 provides a helium atmosphere around the "spent" fuel element during lowering thereof through the chamber 71 and when located in the container 75. The helium atmosphere in the chamber 71 and in the container 75 also serves to provide an inert atmosphere during subsequent uniting of the cap 79 to the container 75. After the "spent" fuel element is deposited in the container 75, the grapple 47 is withdrawn into the charge machine and the isolation valve 85 is closed to seal the chamber 71.

The capping arm 347 is then actuated to position the cap 79 within the open, upper end of the container 75. When the cap is thus positioned, the induction coil 357 is energized to effect uniting of the cap to the container. In the disclosed construction, the cap is brazed to the container. After the cap 79 has been effectively united to the container 75 to provide both a mechanical connection and a hermetic seal, the capping-arm ram 351 is energized to relocate the capping arm 347 in position for receiving another cap. The resilient characteristics of the gripping fingers 353 permit their disengagement from the cap 79 as the capping arm 347 moves to its "cap-loading" position. After the "spent" fuel element is sealed within the container 75, the contaminated gas in the chamber is evacuated by the purging means 87. At this time, and prior to refilling of the chamber with air, the hermetic seal between the cap and the container is preferably leak tested to insure against escape of subsequently contaminated helium gas from the container.

In order to prevent the escape of helium to the "spent" fuel element storage area and to prevent loss of helium to the surrounding environment when the chamber 71 is later opened to permit loading of another container and cap, the chamber 71 is cleared of helium and refilled with air. The "canned" fuel element can now be discharged after the pneumatic expansion seal 343 is collapsed and the supporting pawl 329 is moved away from the bottom of the container.

At any time after the grapple is withdrawn into the cavity 105 of the charge machine, and after closing of the isolation valve 85, the isolation valve 43 in the charge machine can be closed and the space between the closed isolation valves purged and refilled with "clean" air. The supply of "clean" air to the space between the isolation valves permits disengagement of the pressure plate 161 from the gasket 307 and removal of the charge machine 25 from the canning machine 31 without loss to the surrounding environment of the contaminated gas.

Although the foregoing description is generally confined to a handling of fuel elements, it should be understood that the charge machine and canning machine disclosed herein are not limited for use with fuel elements but are adapted for handling and canning various other components, as for instance, control rods and radiation samples. Accordingly, as used in the claims, the terms "fuel element" or "spent" fuel element are intended to apply to all such other components which may be associated with a reactor and are adapted for handling by the disclosed apparatus.

We claim:

1. Fuel element handling apparatus comprising a shielded housing adapted for receiving a fuel element, a grapple movable vertically in said housing, said grapple including a body having a plurality of gripping members pivotally mounted adjacent the lower end thereof for lateral swinging movement relative to said body, an axially movable plunger in said housing, said plunger being connected to said gripping members in a manner affording controlled lateral movement thereof as an incident to axial movement of said plunger, means for raising and lowering said grapple including means connected to said grapple and extending exteriorly of said housing, means connected to said plunger and operable to effect controlled movement of said plunger to actuate said gripping members for movement relative to their gripping position, and sealing means associated with said housing and including a pair of resilient elements adapted to bear against the opposite sides of said means connected to said grapple and against the opposite sides of said means connected to said plunger, and fluid means for pressing said elements into intimate contact with said means connected to said grapple and said means connected to said plunger.

2. Article handling means for releasably engaging an article and for raising and lowering said article, said means comprising a housing, a grapple including a body in said housing and having at one end thereof a plurality of gripping members movable relative to a position for gripping the article, and a relatively movable plunger in said body, said plunger being connected to said gripping members to cause movement thereof relative to said gripping positions as an incident to axial movement of said plunger, a first rotatable drum means carrying a first flexible member connected to said grapple body, a second rotatable drum means carrying a second flexible member connected to said plunger, means supporting said second drum means for vertical movement relative to said housing, means for rotating said drums so as to provide for travel of said first and second flexible members at the same rate, and means for selectively varying the distance between said second drum and said housing, whereby said plunger is caused to move in said body so as to operate said gripping members as an incident to the variation in the effective distance between said first and second drum means and said housing.

3. Means for releasably engaging a fuel element or the like and for raising and lowering said fuel elements, said means comprising a grapple including a body having at one end thereof a plurality of gripping members movable relative to a position for gripping the end of a fuel element, and a relatively movable plunger in said body, said plunger being connected to said gripping members to cause movement thereof relative to said gripping positions as an incident to movement of said plunger, means for raising and lowering said grapple including a first drum means and power means for rotating said first drum means, means for connecting said grapple to said raising and lowering means including a first flexible member connected to said first drum means and to said body and a first idler pulley around which said first flexible member is trained between said first drum means and said body, and means for moving said plunger relative to said body to actuate said gripping members and including a second drum means drivingly connected to said power means, a second flexible member connected to said plunger and to said second drum means for travel at the same rate as said first flexible member incident to operation of said power means, and including a second idler pulley around which said second flexible member is trained between said second drum means and said plunger, said second idler pulley being mounted for movement relative to said first idler pulley to vary the effective distance between said second drum means and said body, whereby said plunger is caused to move in said body so as to operate said gripping members, and means for selectively moving said second idler pulley relative to said first idler pulley.

4. In apparatus for releasably engaging, lifting carrying, and lowering fuel elements, or the like, relative to a series of spaced receptacles, the combination of a shielded housing adapted for receiving a fuel element, said housing having an opening provided in its lower end, means communicating with said opening in the lower end of said housing and movable relative thereto for engagement with the mouth of any one of the receptacles to provide a fluid-tight engagement between said housing and the receptacle, valve means carried by said housing and disposed to control fluid communication through the opening in said lower end of said housing for selectively providing a fluid-tight seal at the lower end of said housing and permitting access to said housing for entry therein and removal therefrom of a fuel element, a grapple movable in said housing and through said opening in the lower end of said housing into any of the receptacles, said grapple including a body having at the lower end thereof a plurality of gripping members movable relative to a position for gripping an end of a fuel element, and a movable plunger in said body, said plunger being connected to said gripping members to cause movement thereof relative to said gripping positions as an incident to movement of said plunger, means located exteriorly of said housing for raising and lowering said grapple including a first drum means and power means for rotating said first drum means, means for connecting said grapple to said raising and lowering means so as to support said grapple and any load carried thereby, said connecting means including an equalizer bar pivotally connected intermediate its ends to the upper end of said grapple body, a pair of flexible tape members connected to said first drum means and to the opposite ends of said equalizer bar, and a pair of idler pulleys located exteriorly of said housing and around which said pair of flexible tape members are trained between said first drum means and said equalizer bar, and means exteriorly of said housing for indicating the strain on said flexible tape members including a movable mounting for said pair of idler pulleys and strain gauges engageble by said movable mountings, means for moving said plunger to thereby actuate said gripping members for movement relative to their gripping positions including a second drum means exteriorly of said housing and drivenly connected to said power means a third flexible tape member connected to said plunger and to said second drum means for travel at the same rate as said pair of flexible tape members incident to operation of said power means, a third idler pulley exteriorly of said housing and around which said third flexible tape member is trained between said second drum means and said plunger, said third idler pulley being movable relative to said pair of idler pulleys to vary the effective distance between said second drum means and said grapple body as compared to the effective distance between said first drum means and said grapple body, whereby said plunger is caused to move in said body so as to operate said gripping members, and cam means for moving said third idler pulley relative to said pair of idler pulleys, and means for permitting pasage through the upper end of said housing of said flexible tape members, said last mentioned means including a pair of resilient elements for bearing against the opposite sides of said flexible tape members, and pressure fluid means for pressing said resilient elements into intimate contact with said flexible tape members.

References Cited in the file of this patent

UNITED STATES PATENTS

| | | |
|---|---|---|
| 2,940,618 | Britt | June 14, 1960 |
| 2,952,959 | Piazze | Sept. 20, 1960 |
| 2,977,005 | Teste et al. | Mar. 28, 1961 |
| 2,995,882 | Barnby | Aug. 15, 1961 |
| 3,025,226 | Martin | Mar. 13, 1962 |
| 3,095,102 | Nadler | June 25, 1963 |

FOREIGN PATENTS

| | | |
|---|---|---|
| 1,230,027 | France | Mar. 28 1960 |